US010420008B2

(12) United States Patent
Rofougaran et al.

(10) Patent No.: US 10,420,008 B2
(45) Date of Patent: Sep. 17, 2019

(54) METHOD AND SYSTEM FOR UTILIZING OUT OF BAND SIGNALING FOR CALIBRATION AND CONFIGURATION OF A MESH NETWORK OF EHF TRANSCEIVERS/REPEATERS

(71) Applicant: AVAGO TECHNOLOGIES GENERAL IP (SINGAPORE) PTE. LTD., Singapore (SG)

(72) Inventors: Ahmadreza Rofougaran, Newport Coast, CA (US); Maryam Rofougaran, Rancho Palos Verdes, CA (US)

(73) Assignee: AVAGO TECHNOLOGIES INTERNATIONAL SALES PTE. LIMITED, Singapore (SG)

( * ) Notice: Subject to any disclaimer, the term of this patent is extended or adjusted under 35 U.S.C. 154(b) by 700 days.

(21) Appl. No.: 14/665,770

(22) Filed: Mar. 23, 2015

(65) Prior Publication Data

US 2016/0286458 A1  Sep. 29, 2016

Related U.S. Application Data

(63) Continuation of application No. 11/871,702, filed on Oct. 12, 2007, now Pat. No. 9,002,261.

(51) Int. Cl.
*H04W 40/22* (2009.01)
*H04W 4/80* (2018.01)
(Continued)

(52) U.S. Cl.
CPC .......... *H04W 40/22* (2013.01); *H04B 7/2606* (2013.01); *H04L 41/0803* (2013.01);
(Continued)

(58) Field of Classification Search
None
See application file for complete search history.

(56) References Cited

U.S. PATENT DOCUMENTS 6,032,057 A     2/2000  Kiiski
6,668,008 B1 *  12/2003 Panasik ............... H04B 7/2603
                                              342/202

(Continued)

*Primary Examiner* — Chi H Pham
*Assistant Examiner* — Vladislav Y Agureyev
(74) *Attorney, Agent, or Firm* — Xsensus LLP

(57) ABSTRACT

A plurality of repeater devices, each of which may enable forwarding extreme high frequency (EHF) communication between EHF-enabled wireless devices, may form a repeater mesh network. Some or all of the plurality of repeater devices may utilize non-extremely high frequency (non-EHF) control connection in communicating with other repeater devices in the repeater mesh network. The non-EHF control connections may be utilized in establishing, configuring, and/or managing the repeater mesh network. The non-EHF control connections may be also be utilized to enable sending, requesting, and/or receiving periodic and/or dynamic control information. The non-EHF control connections may also be utilized while forming, and/or managing forwarding routes of EHF communication via the repeater mesh network, to enable negotiating and/or setting different isolation techniques among the repeater devices, such as polarization isolation, spatial isolation, and/or use of different frequencies.

20 Claims, 4 Drawing Sheets

(51) Int. Cl.
*H04B 7/26* (2006.01)
*H04L 12/24* (2006.01)
*H04W 72/04* (2009.01)
*H04W 84/18* (2009.01)

(52) U.S. Cl.
CPC ......... *H04W 4/80* (2018.02); *H04W 72/0453* (2013.01); *H04W 84/18* (2013.01)

(56) References Cited

U.S. PATENT DOCUMENTS

| | | | |
|---|---|---|---|
| 7,664,054 B2* | 2/2010 | Adya | H04W 8/005 370/255 |
| 2002/0012336 A1 | 1/2002 | Hughes et al. | |
| 2002/0165002 A1* | 11/2002 | Kolinko | H01Q 1/125 455/500 |
| 2004/0264701 A1* | 12/2004 | Lee | H04L 9/0827 380/270 |
| 2005/0282494 A1* | 12/2005 | Kossi | H04W 88/06 455/41.2 |
| 2006/0066455 A1* | 3/2006 | Hancock | H04Q 9/00 340/870.01 |
| 2006/0215624 A1* | 9/2006 | Adya | H04W 8/005 370/338 |
| 2006/0233191 A1* | 10/2006 | Pirzada | H04N 21/4126 370/463 |
| 2007/0075802 A1* | 4/2007 | Gruchalla | H01P 5/10 333/25 |
| 2007/0177495 A1* | 8/2007 | Ametsitsi | H04L 69/32 370/208 |
| 2007/0184779 A1* | 8/2007 | Park | H04W 8/005 455/41.2 |
| 2007/0205867 A1* | 9/2007 | Kennedy | G06K 7/10306 340/10.1 |
| 2008/0002652 A1* | 1/2008 | Gupta | H01Q 1/2291 370/338 |
| 2008/0136736 A1* | 6/2008 | Proctor | H01Q 21/007 343/893 |
| 2008/0167063 A1* | 7/2008 | Nandagopalan | H04B 1/719 455/522 |
| 2008/0175197 A1* | 7/2008 | Shao | H04W 72/02 370/329 |
| 2008/0175198 A1* | 7/2008 | Singh | H04W 28/18 370/329 |
| 2008/0175199 A1* | 7/2008 | Shao | H04W 28/26 370/329 |
| 2008/0175210 A1* | 7/2008 | Jamieson | H04W 24/10 370/338 |
| 2008/0291855 A1* | 11/2008 | Bata | H04W 52/0219 370/311 |
| 2008/0310354 A1* | 12/2008 | Hansen | H04W 72/04 370/329 |
| 2008/0311944 A1* | 12/2008 | Hansen | G01S 1/02 455/517 |
| 2009/0067846 A1* | 3/2009 | Yu | H04B 10/1143 398/128 |
| 2009/0073954 A1* | 3/2009 | Maltsev | H04W 72/082 370/347 |
| 2009/0098824 A1* | 4/2009 | Rofougaran | H04B 7/2606 455/13.1 |
| 2009/0196180 A1* | 8/2009 | Bahl | H04L 5/0032 370/235 |
| 2009/0245159 A1* | 10/2009 | Oyman | H04B 7/2606 370/315 |
| 2009/0310592 A1* | 12/2009 | Kessleman | H04W 72/121 370/347 |
| 2010/0315990 A1* | 12/2010 | Utagawa | H01Q 1/248 370/315 |
| 2013/0029685 A1* | 1/2013 | Moshfeghi | G01S 19/48 455/456.1 |
| 2013/0084868 A1* | 4/2013 | Song | H04W 36/0055 455/436 |
| 2013/0095747 A1* | 4/2013 | Moshfeghi | H04W 88/06 455/7 |
| 2014/0155054 A1* | 6/2014 | Henry | H04W 36/22 455/422.1 |
| 2014/0337838 A1* | 11/2014 | Hyde | H04W 76/023 718/1 |
| 2016/0143033 A1* | 5/2016 | Falkenstein, Jr. | H04B 7/15 370/338 |
| 2016/0182469 A1* | 6/2016 | Ahmed | H04L 63/0492 380/270 |

* cited by examiner

METHOD AND SYSTEM FOR UTILIZING OUT OF BAND SIGNALING FOR CALIBRATION AND CONFIGURATION OF A MESH NETWORK OF EHF TRANSCEIVERS/REPEATERS

CROSS-REFERENCE TO RELATED APPLICATIONS/INCORPORATION BY REFERENCE

The present application is a Continuation of U.S. application Ser. No. 11/871,702, filed on Oct. 12, 2007, the entire contents of which incorporated herein by reference.

FIELD OF THE INVENTION

Certain embodiments of the invention relate to wireless communication. More specifically, certain embodiments of the invention relate to a method and system for utilizing out of band signaling for calibration and configuration of a mesh network of EHF transceivers/repeaters.

BACKGROUND OF THE INVENTION

In 2001, the Federal Communications Commission (FCC) designated a large contiguous block of 7 GHz bandwidth for communications in the 57 GHz to 64 GHz spectrum. This frequency band was designated for use on an unlicensed basis, that is, the spectrum is accessible to anyone, subject to certain basic, technical restrictions such as maximum transmission power and certain coexistence mechanisms. The communications taking place in this band are often referred to as '60 GHz communications.' With respect to accessibility of this designated portion of the spectrum, 60 GHz communications is similar to other forms of unlicensed spectrum use, for example Wireless LANs (WLAN) or Bluetooth in the 2.4 GHz ISM bands. However, communications at 60 GHz may be significantly different in aspects other than accessibility. For example, 60 GHz signals may provide markedly different communications channel and propagation characteristics, at least due to the fact that 60 GHz radiation is partly absorbed by oxygen in the air, leading to higher attenuation with distance. On the other hand, since a very large bandwidth of 7 GHz is available, very high data rates may be achieved. Among the applications for 60 GHz communications are wireless personal area networks, wireless high-definition television signal, for example from a set top box to a display, or Point-to-Point links.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for utilizing out of band signaling for calibration and configuration of a mesh network of EHF transceivers/repeaters, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for utilizing out of band signaling for calibration and configuration of a mesh network of EHF transceivers/repeaters. A plurality of repeater devices, each of which may enable forwarding extreme high frequency (EHF) communication between EHF-enabled wireless devices, may form a repeater mesh network. Some or all of the plurality of repeater devices may utilize non-extremely high frequency (non-EHF) control connection, comprising non-EHF wireless protocols such as Bluetooth, ZigBee, WiFi, and/or ultra-wideband (UWB), in communicating with other repeater devices in the repeater mesh network. The non-EHF control connections may be utilized in establishing, configuring, and/or managing the repeater mesh network. Some or all of the plurality of repeater devices may utilize the non-EHF control connection to send, request, and/or receive periodic and/or dynamic control information. The non-EHF control connections may also be utilized while forming, and/or managing forwarding routes of EHF communication via the repeater mesh network, wherein these connection may enable negotiating and/or setting different isolation techniques among the repeater devices, while forming routes within the repeater mesh network, to reduce and/or prevent interference that might be caused by EHF RF signals received and/or transmitted by repeater devices in the repeater mesh network. These techniques may comprise polarization isolation, spatial isolation, and/or use of different frequencies.

Figure 1:
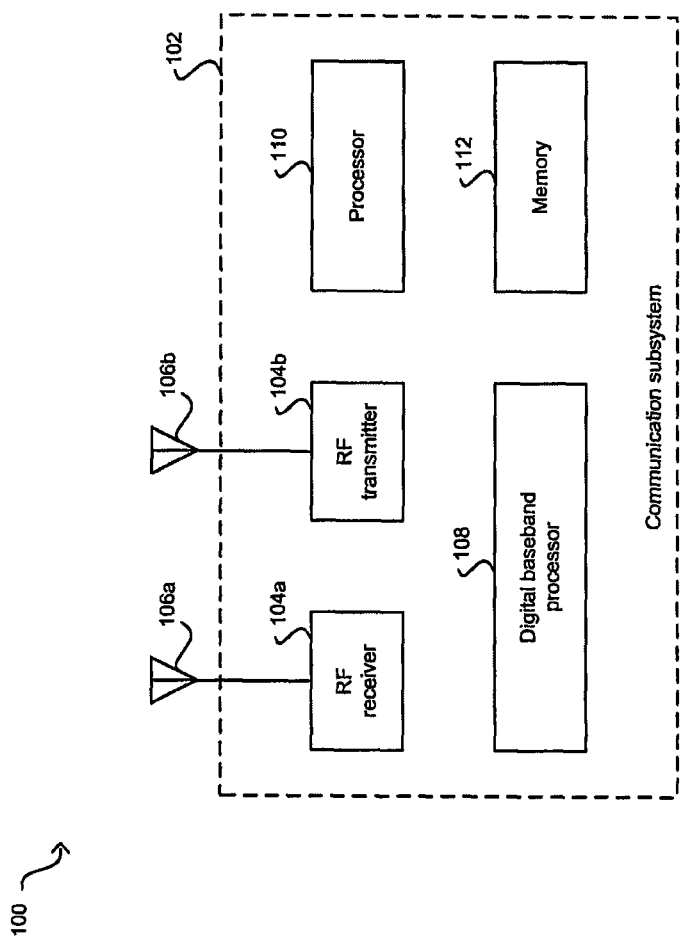
FIG. 1 is a block diagram illustrating an exemplary communication subsystem, which may be utilized in accordance with an embodiment of the invention.

FIG. 1 is a block diagram illustrating an exemplary communication subsystem, in accordance with an embodiment of the invention. Referring to FIG. 1, there is shown a communication subsystem 102, an RF receiver 104a, an RF transmitter 104b, a receive antenna 106a, a transmit antenna 106b, a digital baseband processor 108, a processor 110, and a memory 112.

The communication subsystem 102 may comprise the RF receiver 104a, the RF transmitter 104b, the receive antenna 106a, the transmit antenna 106b, the digital baseband processor 108, the processor 110, the memory 112, and may also comprise additional suitable logic, circuitry, and/or code that may enable receiving, transmitting, and processing of RF signals. For example, the communication subsystem 102 may be integrated or located within a wireless device to enable operations in a wireless system, such as the cellular network and/or digital video broadcast network.

The receive antenna 106a may comprise suitable logic, circuitry, and/or code that may enable reception of RF signals; receive antenna 106a may be communicatively coupled to the RF receiver 104a. The RF receiver 104a may comprise suitable logic, circuitry, and/or code that may enable processing of received RF signals. The RF receiver 104a may enable receiving extremely high frequency (EHF) signals at, for example, approximately 60 GHz. In this regard, the RF receiver 104a may be enabled to generate signals, such as local oscillator signals, for the reception and processing of EHF signals. The RF receiver 104a may down-convert received RF signals to a baseband frequency signal. The RF receiver 104a may perform direct down-conversion of the received RF signals to a baseband frequency signal, for example. In some instances, the RF receiver 104a may enable analog-to-digital conversion of the baseband signal components before transferring the components to the digital baseband processor 108. In other instances, the RF receiver 104a may transfer the baseband signal components in analog form. The receive antenna 106a and the RF receiver 104a may also enable reception of non-EHF RF signals. For example, the receive antenna 106a and the RF receiver 104a may enable receiving and/or processing of Bluetooth RF signals.

The transmit antenna 106b may comprise suitable logic, circuitry, and/or code that may enable transmission of RF signals; the transmit antenna 106b may be communicatively coupled to the RF transmitter 104b. The RF transmitter 104b may comprise suitable logic, circuitry, and/or code that may enable processing of RF signals for transmission. The RF transmitter 104b may enable transmission of extremely high frequency (EHF) signals at, for example, approximately 60 GHz. In this regard, the RF transmitter 104b may be enabled to generate signals, such as local oscillator signals, for the transmission and processing of EHF signals. The RF transmitter 104b may up-convert the baseband frequency signal to an RF signals. The RF transmitter 104b may perform direct up-conversion of the baseband frequency signal to RF signals of approximately 60 GHz, for example. In some instances, the RF transmitter 104b may enable digital-to-analog conversion of the baseband signal components received from the digital baseband processor 108 before up conversion. In other instances, the RF transmitter 104b may receive baseband signal components in analog form. The transmit antenna 106b and the RF transmitter 104b may also enable transmission of non-EHF RF signals. For example, the transmit antenna 106b and the RF transmitter 104b may enable transmitting and/or processing of Bluetooth RF signals.

The digital baseband processor 108 may comprise suitable logic, circuitry, and/or code that may enable processing and/or handling of baseband frequency signals. In this regard, the digital baseband processor 108 may process or handle signals received from the RF receiver 104a and/or signals to be transferred to the RF transmitter 104b. The digital baseband processor 108 may also provide control and/or feedback information to the RF receiver 104a and to the RF transmitter 104b based on information from the processed signals. The digital baseband processor 108 may communicate information and/or data from the processed signals to the processor 110 and/or to the memory 112. Moreover, the digital baseband processor 108 may receive information from the processor 110 and/or to the memory 112, which may be processed and transferred to the RF transmitter 104b for transmission to the network.

The processor 110 may comprise suitable logic, circuitry, and/or code that may enable control and/or data processing operations for the communication subsystem 102. The processor 110 may be utilized to control at least a portion of the RF receiver 104a, the RF transmitter 104b, the digital baseband processor 108, and/or the memory 112. In this regard, the processor 110 may generate at least one signal for controlling operations within the communication subsystem 102. The processor 110 may also enable executing of applications that may be utilized by the communication subsystem 102. For example, the processor 110 may execute applications that may enable displaying and/or interacting with content received via RF signals in the communication subsystem 102.

The memory 112 may comprise suitable logic, circuitry, and/or code that may enable storage of data and/or other information utilized by the communication subsystem 102. For example, the memory 112 may be utilized for storing processed data generated by the digital baseband processor 108 and/or the processor 110. The memory 112 may also be utilized to store information, such as configuration information, that may be utilized to control the operation of at least one block in the communication subsystem 102. For example, the memory 112 may comprise information necessary to configure the RF receiver 104a to enable receiving signals in the appropriate frequency band.

In operation, the communication subsystem 102 may enable communication via RF interfaces. The communication subsystem 102 may be integrated within a wireless device to enable communication via an EHF interface, for example the 60 GHz band. For example, the communication subsystem 102 may receive RF signals operating in the 60 GHz band via the receive antenna 106a; wherein the RF receiver 104a may enable initial processing of the received signal. The communication subsystem 102 may transmit RF signals operating in the 60 GHz band via the RF transmitter 104b and the transmit antenna 106b. The digital baseband processor 108, the processor 110, and the memory 112 may enable performing control and/or related operation during transmission and/or reception of RF signals. For example, the memory 112 may be utilized to store and/or fetch data that may be received and/or transmitted via 60 GHz RF signals. The digital 108 may enable performing signal processing operation such as analog-to-digital conversion, encoding/decoding of received and/or transmitted data via the 60 GHz RF signals. The processor 110 may enable controlling of the operations of the communication subsystem 102. For example, the processor 110 may enable operating of the transmit and/or the receive antennas to enable aligning during 60 GHz RF communications.

In addition to EHF communications, which may have limited operational range compared with lower frequency RF interfaces, the communication subsystem 102 may be enabled to utilize other wireless interfaces and/or protocols. For example, the communication subsystem 102 may be enabled to utilize such wireless interfaces as Bluetooth to perform Bluetooth RF communications. Accordingly, the receive antenna 106a, the RF receiver 104a, and/or other components within the communication subsystem 102 may enable reception of non-EHF RF signals, for example, Bluetooth RF signals. Similarly, the transmit antenna 106b, the RF transmitter 104b, and/or other components within the communication subsystem 102 may enable transmission of non-EHF RF signals, for example, Bluetooth RF signals. The non-EHF interfaces that may be supported in the communication subsystem 102 may be utilized to send information regarding the communication subsystem 102.

For example, a Bluetooth connection may be utilized to send information regarding the capability of the communication subsystem 102 and/or to receive messages containing information regarding preferred setting that may be utilized while performing EHF communication.

In an embodiment of the invention, repeater devices may be utilized to extend the range of EHF communication between wireless devices within the communication system 100. EHF communication may generally have limited range, typically operating only in "line-of-sight" settings. Consequently, it may be desirable to utilize other devices, for example, repeater devices, to extend the range of communication between EHF-enabled devices. Additionally, because utilizing a single repeater device may not yield substantial increase in the range of EHF RF communication, a group of repeater devices, forwarding EHF RF signals in chain-like configuration, may be utilized.

To facilitate utilizing a plurality of repeater devices, control connections may be utilized by one or more of the plurality of the repeater devices to enable the repeater devices to coordinate the EHF forwarding operations. Because of the limited range of the EHF interface, non-extremely high frequency (non-EHF) connection, with higher range may be utilized. For example, Bluetooth, ZigBee, WiFi, and/or ultra-wideband (UWB) connections may be utilized to coordinate among the plurality of repeater devices. Accordingly, the communication system 100 may enable utilizing non-EHF interface. The communication subsystem 102 may enable generation and/or processing of non-EHF signals. Non-EHF signals may be transmitted and/or received via the receive antenna 106a and/or the transmit antenna 106b. In an alternate embodiment of the invention, dedicated and/or distinct antenna components may be utilized to transmit and/or receive non-EHF signals.

Figure 2:
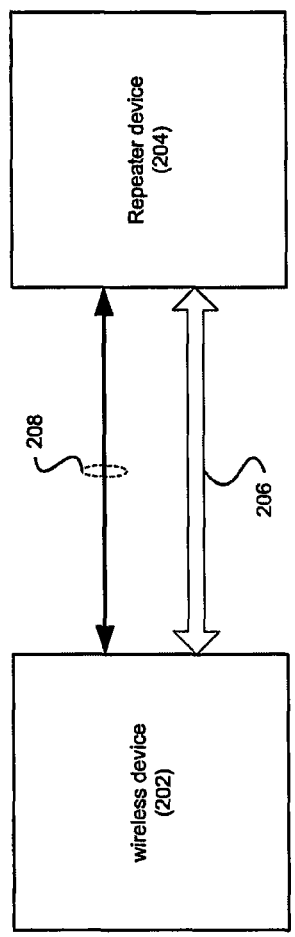
FIG. 2 is a block diagram illustrating a repeater device utilized to forward EHF RF communication between two wireless devices, which may be utilized in accordance with the invention.

FIG. 2 is a block diagram illustrating a repeater device utilized to forward 60 GHz communication between two wireless devices, which may be utilized in accordance with an embodiment of the invention. Referring to FIG. 2, there is shown a wireless device 202, a repeater device 204, an EHF connection 206, and a control connection 208.

The wireless device 202 may each comprise suitable logic, circuitry, and/or code that may enable receiving, transmitting, and processing of RF signals. For example, the wireless device 202 may comprise the communication subsystem 102, substantially as described in FIG. 1.

The repeater device 204 may comprise suitable logic, circuitry, and/or code that may enable reception and/or transmission of EHF signals to facilitate forwarding EHF signals transmitted by the wireless device 202. Additionally, the repeater device 204 may comprise suitable logic, circuitry, and/or code that may enable establishing and/or utilizing control connection 208 with the wireless device 202 via non-EHF interface, for example, Bluetooth, ZigBee, WiFi, and/or ultra-wideband (UWB).

The EHF connection 206 may comprise a radio (RF) and/or wireless link that may be based on an EHF protocol that may comprise the 60 GHz interface. The control connection 208 may comprise a radio (RF) and/or wireless link that may be based on a non-EHF protocol that may comprise Bluetooth, ZigBee, WiFi, and/or ultra-wideband (UWB). The control connection 208 may be utilized to communicate control messages, for example, between the wireless device 202 and the repeater device 204.

In operation, the repeater device 204 may enable forwarding EHF RF signals transmitted and/or received by the wireless device 202 via the EHF connection 206. EHF communication may generally have limited range, typically operating only in "line-of-sight" settings. Consequently, it may desirable to utilize other devices, for example, repeater devices such as the repeater device 204, to extend the range of communication between EHF-enabled devices.

The wireless device 202 may utilize the communication subsystem 102 to enable transmission and/or reception of EHF RF signals via the EHF connection 206. The repeater device 204 may be utilized because EHF RF signals may have limited operational range. The wireless device 202, and/or the repeater device 204 may utilize the control connection 208 during EHF communication between devices. The control connections 208 may enable exchanging control messages, data, and/or information that may enable facilitating EHF communication via the EHF connection 206. For example, the control connection 208 may enable the wireless device 202 to determine whether the repeater device 204 may be utilized to forward EHF RF signal transmitted by wireless device 202. Alternatively, the repeater device 204 may utilize the control connection 206 to notify the wireless device 202 of an impending EHF communication targeted for the wireless device 202.

While it may be desirable to utilize the repeater device 204 to forward EHF RF signals transmitted and/or received by the wireless device 202, the operational effectiveness of the repeater device 204 may be limited by the operational limitations of EHF communication since the main purpose for utilizing the repeater device 204 may be receiving and transmitting EHF RF signals. Consequently, it may be desirable to utilize a plurality of repeater devices, similar to the repeater device 204, which may be enabled, in their totality, to provide a substantial increase in the EHF communication range of the wireless device 202.

To facilitate utilizing a plurality of repeater devices, control connections may be utilized by one or more of the plurality of the repeater devices to enable the repeater devices to coordinate the EHF forwarding operations. Because of the limited range of the EHF interface, non-extremely high frequency (non-EHF) connection, with higher range may be utilized. For example, Bluetooth, ZigBee, WiFi, and/or ultra-wideband (UWB) connections may be utilized to coordinate among the plurality of repeater devices. Accordingly, because the repeater device 204 may be enabled to utilize one or more non-EHF interfaces, the repeater device 204 may be enabled to generate and/or process of non-EHF signals that may be transmitted and/or received to communication and/or coordinate with other repeater devices via non-EHF interfaces.

Figure 3:
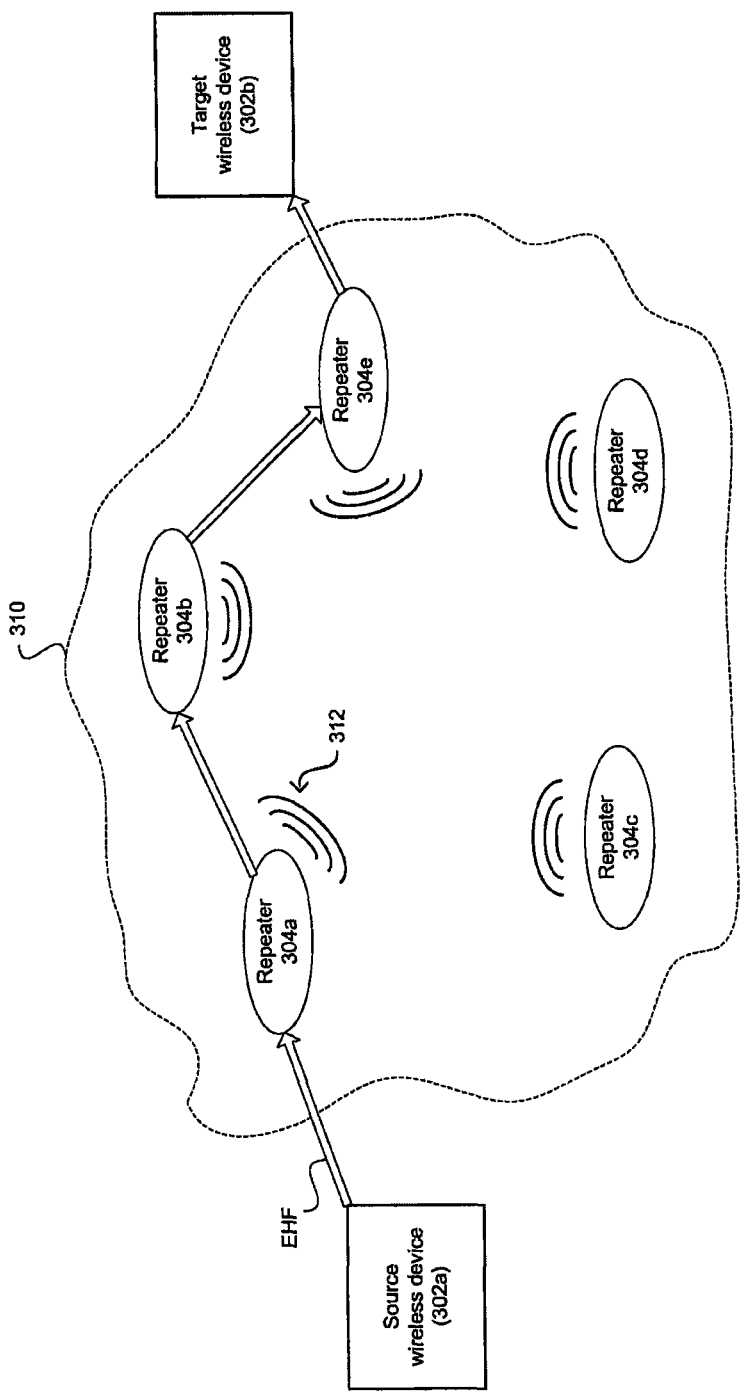
FIG. 3 is a block diagram illustrating a mesh network of EHF repeaters that utilize Non-EHF intra-mesh control connections for configuring and managing the mesh network, which may be utilized in accordance with an embodiment of the invention.

FIG. 3 is a block diagram illustrating a mesh network of EHF repeaters that utilize Non-EHF intra-mesh control connections for configuring and managing the mesh network, which may be utilized in accordance with an embodiment of the invention. Referring to FIG. 3, there is there is shown, a source wireless device 302a, a target wireless devices 302b, a plurality of EHF repeater devices 304a, 304b, 304c, 304d, and 304e, a repeater mesh network 310, and a non-EHF interface 312.

The source wireless device 302a and the target wireless device 302b may each comprise suitable logic, circuitry, and/or code that may enable receiving, transmitting, and processing of RF signals. For example, the source wireless device 302a and the target wireless device 302b may each be comprised substantially similar to the wireless device 202, as described in FIG. 2.

Each of the plurality of EHF repeater devices 304a, 304b, 304c, 304d, 304a, and 304f may comprise suitable logic, circuitry, and/or code that may enable reception and/or transmission of EHF signals, and may be utilized to facilitate forwarding EHF RF signals between EHF-enabled devices. For example, each of the plurality of repeater devices 304a, 304b, 304c, 304d, and 304e may be comprised substantially similar to the repeater device 204, as described in FIG. 2. Additionally, each of the plurality of repeater devices 304a, 304b, 304c, 304d, 304a, and 304f may be enabled to utilize transmission and/or reception of non-EHF signals to enable coordinating and/or communication with other repeater and/or wireless devices within operations proximity.

The repeater mesh network 310 may comprise a plurality of EHF repeater devices, for example, the plurality of EHF repeater devices 304a, 304b, 304c, 304d, and 304e, and may comprise suitable logic, circuitry, and/or code that may enable the plurality of EHF repeater devices 304a, 304b, 304c, 304d, and 304e to forward EHF communication, and to utilize non-EHF signals to enable communicating and/or coordinating among the plurality of repeater devices.

The non-EHF interface 312 may comprise radio frequency (RF) and/or wireless links, which may be based on a non-extremely high frequency (non-EHF) non-EHF protocol. The non-EHF interface 312 may be utilized by each of the plurality of repeater devices 304a, 304b, 304c, 304d, and 304e to enable non-EHF communication among repeater devices in the repeater mesh network 310. For example, the non-EHF interface 312 may comprise Bluetooth, ZigBee, WiFi, and/or ultra-wideband (UWB) signals transmitted and/or received by each of the plurality of repeater devices 304a, 304b, 304c, 304d, and 304e while communicating with other repeater devices.

In operation, the plurality of repeater devices 304a, 304b, 304c, 304d, and 304e may establish the repeater mesh network 310. The repeater mesh network 306 may enable forwarding EHF RF communication via the plurality of repeater devices 304a, 304b, 304c, 304d, and 304e, wherein routes comprised of some or all of the plurality of the repeater devices 304a, 304b, 304c, 304d, and 304e may be utilized to route EHF RF signals via the repeater mesh network 310. For example, the repeater devices 304a, 304b, and 304e may be utilized to establish a route for forwarding of EHF signals via the repeater mesh network 310. The repeater mesh network 310 may be formed when repeater devices, for example the plurality of repeater devices 304a, 304b, 304c, 304d, and 304e, are in close proximity of each other to enable EHF forwarding operations. Each of the plurality of repeater devices 304a, 304b, 304c, 304d, and 304e may be enabled to detect the presence of other repeater devices in its vicinity.

During establishment, initial configuration, and/or management of the repeater mesh network 310, each of the plurality of repeater devices 304a, 304b, 304c, 304d, and 304e may utilize the non-EHF interface 312 to communicate with other repeater devices. Use of the non-EHF interface 312 may be desirable for various reasons. First, because EHF communications may generally have limited range, the plurality of repeater devices 304a, 304b, 304c, 304d, and 304e may utilize non-EHF wireless protocols, for example, Bluetooth, WiFi, and/or WiMAX, which may enable the devices to communicate over greater ranges than available via EHF interfaces. Second, use of non-EHF interface 312 may also be desirable because use of EHF interfaces, for intra-mesh communication, may cause interference during EHF forwarding operations, and/or it may potentially use up some of bandwidth that otherwise may have been available during EHF forwarding operations. Finally, use of certain types of non-EHF protocols, for example Bluetooth and/or ZigBee, may enable utilizing already existing detection and/our coupling functionality.

Use of the non-EHF interface 312 may enable each of the plurality of repeater devices 304a, 304b, 304c, 304d, and 304e to determine presence and/or availability of repeater devices that may be utilized during EHF forwarding operations. For example, during establishment of the repeater mesh network 310, where the repeater device 304a may determine the presence of the repeater devices 304b, 304c, and 304e. The repeater devices 304a may utilize control connections via the non-EHF interface 312 to couple itself to the detected repeater devices to facilitate the creation of the repeater mesh network 310. Additionally, where the repeater device 304a may not be able to detect, and/or to couple itself directly to the repeater device 304d, the 304d may still be integrated into the repeater mesh network 310 via the repeater devices 304c and/or 304e. The repeater device 304a may receive messages from other repeater devices reporting presence and/or availability of the repeater device 304d for forwarding EHF signals in the repeater mesh network 310.

After initial formation of the repeater mesh network 310, each of the plurality of repeater devices 304a, 304b, 304c, 304d, and 304e may continue to utilize the non-EHF interface 312 to enable management of the repeater mesh network 312. Each of the plurality of repeater devices 304a, 304b, 304c, 304d, and 304e may be setup to utilize the non-EHF interface 312 to communicate to the other devices in the repeater mesh network 310 dynamic updates pertaining to presence and/or availability of the repeater device for EHF forwarding operations based on occurrence of specific conditions and/or events. For example, the repeater devices 304a may utilize the non-EHF interface 312 to broadcast to the remaining repeater devices in the repeater devices in the repeater mesh network 310 "notification" messages indicating that the repeater device 304a may be performing EHF forwarding operation. The repeater devices may utilize such information to determine whether the repeater device 304a may be completely or partially unavailable for performing similar operations. Alternatively, the repeater mesh network 310 may be configured, via the non-EHF interface 312, to enable each of the plurality of repeater devices 304a, 304b, 304c, 304d, and 304e may utilize the non-EHF interface 312 to communicate to the other devices in the repeater mesh network 310 periodic updates pertaining to presence and/or availability of the repeater device for EHF forwarding operations, for example.

The non-EHF interface 312 may also be utilized to perform EHF forwarding via the repeater mesh network 310. Each of the plurality of repeater devices 304a, 304b, 304c, 304d, and 304e may utilize the non-EHF interface 312 to exchange information and/or control messages that may enable the repeater devices to determine, individually and/or collectively, routing paths within the repeater mesh network 310 while transmitting and/or receiving EHF RF signals. For example, the source wireless device 302a may request, via the repeater device 304a, forwarding of EHF communication to the target wireless device 302b. The repeater device 304a may determine, based on pre-existing information, and/or by utilizing the non-EHF interface 312 to send and/or receive reporting messages, that the end wireless devices 302b may be reached via the repeater devices 302b and 302e. Consequently, the repeater device 304a may utilize the non-EHF interface 312 to ascertain the availability of repeater devices 302b and 302e for performing EHF forwarding operations between the source wireless device 302a and the target wireless device 302b.

Once forwarding routes via the repeater mesh network 310 are determined, the non-EHF interface 312 may also be utilized to facilitate and/or optimize the forwarding of EHF communication. For example, to improve the effectiveness of the repeater mesh network 310, different isolation techniques may be utilized in one or more of repeater devices that may form routes within the repeater mesh network 310, to reduce and/or prevent interference that might be caused by EHF RF signals received and/or transmitted by repeater devices in the repeater mesh network 310. These techniques may comprise spatial isolation, and/or polarization isolation, and/or use of different EHF frequencies. One of more of the plurality of repeater devices 304a, 304b, 304c, 304d, and 304e may utilize the non-EHF interface 312 to negotiate and/or assign proper polarization, spatial transmission, and/or frequency allocation settings utilized by repeater devices that may be utilized in forming the routes and/or may potentially interfere with EHF communication performed via the forwarding routes. The non-EHF interface 312 may also enable continued management of an on-going EHF communication forwarding via the repeater mesh network 310, wherein one or more of the plurality of repeater devices 304a, 304b, 304c, 304d, and 304e, comprising repeater devices that may not be actively participating in the EHF communication forwarding, may continue to send and/or request reporting control message regarding status of the EHF communication and/or occurrence of conditions that may affect the EHF communication and/or availability of repeater devices utilized in the forwarding routes.

Figure 4:
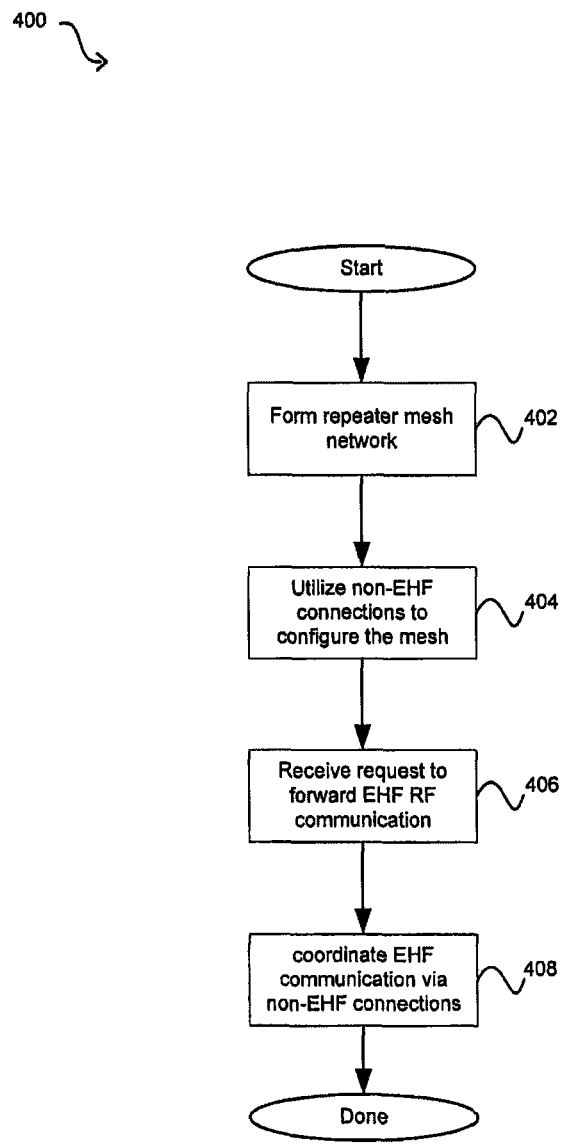
FIG. 4 is an exemplary flow diagram illustrating use of Non-EHF intra-mesh connections in a mesh network of EHF repeaters, in accordance with an embodiment of the invention.

FIG. 4 is an exemplary flow diagram illustrating use of Non-EHF intra-mesh connections in a mesh network of EHF repeaters, in accordance with an embodiment of the invention. Referring to FIG. 4, there is shown a flow chart 400 comprising a plurality of exemplary steps. In step 402, a plurality of repeater devices may form a repeater mesh network for forwarding extremely high frequency (EHF) communication between wireless devices. For example, the plurality of repeater devices 304a, 304b, 304c, 304d, and 304e may establish the repeater mesh network 310; which may enable forwarding EHF RF communication via routes that may comprise some or all of the repeater devices. Non-extremely high frequency (non-EHF) connections that may be established between the repeater devices may be utilized during forming of the repeater mesh network. For example, during establishment of the repeater mesh network 310, some or all of plurality of repeater devices 304a, 304b, 304c, 304d, and 304e may utilize control connections via the non-EHF interface 312 to discover and/or couple themselves together to facilitate the creation of the repeater mesh network 310.

In step 404, non-EHF connections may be utilized in a repeater mesh network to configure and/or manage the repeater mesh network. For example, after initial formation of the repeater mesh network 310, each of the plurality of repeater devices 304a, 304b, 304c, 304d, and 304e may utilize the non-EHF interface 312 to enable management of the repeater mesh network 312. Each of the plurality of repeater devices 304a, 304b, 304c, 304d, and 304e may be setup to utilize the non-EHF interface 312 to communicate to the other devices in the repeater mesh network 310 dynamic updates pertaining to presence and/or availability of the repeater device for EHF forwarding operations. Alternatively, the repeater mesh network 310 may be configured, via the non-EHF interface 312, to enable each of the plurality of repeater devices 304a, 304b, 304c, 304d, and 304e may utilize the non-EHF interface 312 to communicate to the other devices in the repeater mesh network 310 periodic updates pertaining, for example, to presence and/or availability of the repeater device for EHF forwarding operations.

In step 406, a request to forward EHF RF communication via a repeater mesh network may be received. An EHF-enabled wireless device, which may be located in the vicinity of a repeater device in the repeater mesh network, may attempt to forward EHF RF signals via the repeater mesh network. For example, the source wireless device 302a may request, via the repeater device 304a, forwarding of EHF communication to the target wireless device 302b.

In step 408, EHF communication forwarded via a repeater mesh network may be facilitated, coordinated and/or managed by utilizing non-EHF control connections. For example, the non-EHF interface 312 may be utilized to enable the plurality of repeater devices 304a, 304b, 304c, 304d, and 304e to exchange information and/or control messages that may enable forming of routing paths within the repeater mesh network 310. Once forwarding routes via the repeater mesh network 310 are determined, the non-EHF interface 312 may also be utilized to coordinate and/or manage the forwarding of EHF communication. For example, some or all of the plurality devices 304a, 304b, 304c, 304d, and 304e may utilize the non-EHF interface 312 to negotiate and/or assign polarization isolation, spatial isolation, and/or frequency allocation settings, that may reduce and/or prevent interference that might be caused by EHF RF signals received and/or transmitted by repeater devices in the repeater mesh network 310. The non-EHF interface 312 may also enable continued management of an on-going EHF communication forwarding via the repeater mesh network 310. For example, some or all of the plurality of repeater devices 304a, 304b, 304c, 304d, and 304e may continue to send and/or request reporting control message regarding status of the EHF communication and/or occurrence of conditions that may affect the EHF communication and/or availability of repeater devices utilized in the forwarding routes.

Various embodiments of the invention may comprise a method and system for utilizing out of band signaling for calibration and configuration of a mesh network of EHF transceivers/repeaters. The plurality of repeater devices 304a, 304b, 304c, 304d, and 304e, each of which may enable forwarding extreme high frequency (EHF) communication between EHF-enabled wireless devices, may form the repeater mesh network 310. The non-extremely high frequency (non-EHF) control interface 310, comprising non-EHF protocols such as Bluetooth, ZigBee, WiFi, and/or ultra-wideband (UWB), may be utilized by some or all of the plurality of repeater devices 304a, 304b, 304c, 304d, and 304e in communicating with other repeater devices in the repeater mesh network 310. Non-EHF control connections, via the non-EHF interface 312, may be utilized in establishing, configuring, and/or managing the repeater mesh network. Some or all of the plurality of repeater devices 304a, 304b, 304c, 304d, and 304e may utilize the non-EHF control connection to send, request, and/or receive periodic and/or dynamic control information. The non-EHF control connections may also be utilized while forming, and/or managing forwarding routes of EHF communication via the repeater mesh network 310. The non-EHF control connections may enable negotiating and/or setting different isolation techniques that may be utilized, while forming routes within the repeater mesh network 310, to reduce and/or prevent interference that might be caused by EHF RF signals received and/or transmitted by repeater devices in the repeater mesh network 310. These techniques may comprise polarization isolation, spatial isolation, and/or use of different frequencies.

Another embodiment of the invention may provide a machine-readable storage, having stored thereon, a computer program having at least one code section executable by a machine, thereby causing the machine to perform the steps as described herein for utilizing out of band signaling for calibration and configuration of a mesh network of EHF transceivers/repeaters.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A repeater device for wireless communication, the repeater device comprising:
    circuitry configured to:
        utilize a first interface to forward extremely high frequency (EHF) signals communicated between wireless devices;
        utilize a second interface, which is different from the first interface, to coordinate control connections with at least one other repeater device in order to facilitate the forwarding of the EHF signals; and
        coordinate, via the control connections, use of at least polarization isolation techniques on the EHF signals forwarded from each of the repeater device and the other repeater device to reduce interference.

2. The repeater device according to claim 1, wherein the repeater device and the at least one other repeater device establish a repeater mesh network.

3. The repeater device according to claim 1, wherein the EHF signals include 60 GHz signals.

4. The repeater device according to claim 1, wherein the control connections include non-extremely high frequency (non-EHF) connections.

5. The repeater device according to claim 4, wherein the non-EHF connections include Bluetooth, ZigBee, WiFi, and/or ultra-wideband (UWB) connections.

6. The repeater device according to claim 1, wherein the circuitry is further configured to exchange control and/or configuration information with the at least one other repeater device.

7. The repeater device according to claim 6, wherein the circuitry is further configured to perform the exchange of control and/or configuration information during an initial configuration of a mesh network.

8. The repeater device according to claim 6, wherein the circuitry is further configured to perform the exchange of control and/or configuration information periodically.

9. The repeater device according to claim 6, wherein the circuitry is further configured to perform the exchange of control and/or configuration information dynamically based on an occurrence of events and/or conditions.

10. The repeater device according to claim 1, wherein the circuitry is further configured to determine, via the second interface, a presence and/or an availability of other repeater devices within a mesh network.

11. The repeater device according to claim 1, wherein the isolation techniques include coordinating the use of different EHF frequencies for forwarding the EHF signals from each of the repeater device and the other repeater device.

12. The repeater device according to claim 1, wherein coordinating the use of at least the polarization isolation techniques includes transmitting, via the control connections, an assignment of a polarization to be used by the other repeater device when forwarding the EHF signals.

13. A method for wireless communication, the method comprising:
    utilizing, via circuitry of a repeater device, a first interface to forward extremely high frequency (EHF) signals communicated between wireless devices;
    utilizing, via the circuitry of the repeater device, a second interface, which is different from the first interface, to coordinate control connections with at least one other repeater device in order to facilitate the forwarding of the EHF signals; and
    coordinating, via the control connections, use of at least polarization isolation techniques on the EHF signals forwarded from each of the repeater device and the other repeater device to reduce interference.

14. The method according to claim 13, wherein the EHF signals include 60 GHz signals.

15. The method according to claim 13, wherein the control connections include non-extremely high frequency (non-EHF) connections.

16. The method according to claim 13, wherein the non-EHF connections include Bluetooth, ZigBee, WiFi, and/or ultra-wideband (UWB) connections.

17. A non-transitory computer readable medium having a computer program recorded thereon, the computer program configured to perform a method when executed on a computer, the method comprising:
    utilizing a first interface to forward extremely high frequency (EHF) signals communicated between wireless devices;
    utilizing a second interface, which is different from the first interface, to coordinate control connections with at least one repeater device in order to facilitate the forwarding of the EHF signals; and coordinating, via the control connections, use of at least polarization isolation techniques on the EHF signals forwarded from each of the repeater device and the other repeater device to reduce interference.

18. The non-transitory computer readable medium according to claim 17, wherein the EHF signals include 60 GHz signals.

19. The non-transitory computer readable medium according to claim 17, wherein the control connections include non-extremely high frequency (non-EHF) connections.

20. The non-transitory computer readable medium according to claim 17, wherein the non-EHF connections include Bluetooth, ZigBee, WiFi, and/or ultra-wideband (UWB) connections.

\* \* \* \* \*